TIME DELAY SWITCHES UTILIZING CONDUCTIVE LIQUIDS

Filed Nov. 18, 1965

2 Sheets-Sheet 2

United States Patent Office 3,377,445

Patented Apr. 9, 1968

3,377,445

TIME DELAY SWITCHES UTILIZING CONDUCTIVE LIQUIDS

Susumu Ubukata, Nagoya-shi, Yasukazu Mizutani, Chita-gun, Haruki Kusakawa, Hekikai-gun, and Isao Yoshida, Nagoya-shi, Japan, assignors to Susumu Ubukata, Nagoya-shi, Aichi-ken, Japan Filed Nov. 18, 1965, Ser. No. 508,470

Claims priority, application Japan, Nov. 24, 1964, 39/66,100

2 Claims. (Cl. 200—33)

This invention relates to a novel time delay switch utilizing a conductive liquid such as mercury, liquid amalgam containing a metal or metals dissolved in mercury and the like and more particularly to a time delay switch provided with a flow restricting small opening or orifice in the path of the conductive liquid to delay the flow thereof and a means to maintain the conductive liquid in a state of continuous flow.

It is an object of this invention to provide a new and improved time delay switch wherein the conductive liquid is utilized effectively to provide accurate operation and to minimize the required quantity of the conductive liquid with respect to the delay time afforded by the switch.

While it is possible to predetermine the delay time to any desired value by suitable selection of the quantity of the conductive liquid and of the flow resistance mainly determined by the cross sectional area of the orifice and the length of flow, from the standpoint of effective utilization of the conductive liquid, it is desirable to determine the necessary quantity of the conductive liquid with respect to the desired delay time for the switch in the state of maximum flow resistance within the range in which the liquid can flow. However, in a miniature time delay switch utilizing a small quantity of the conductive liquid, for example, less than about five cubic centimeters, the flow of the conductive liquid is greatly influenced by such factors as its surface tension, cohesion, viscosity and the like, so that it is difficult to obtain satisfactory results by merely decreasing the cross sectional area of the flow restricting orifice or increasing the length of the flow path defined thereby in order to increase the flow time.

We have found that these difficulties can be overcome by assuring continuous flow of conductive liquid through the orifice.

Briefly stated, in accordance with this invention there is provided an improved time delay switch comprising a sealed container containing a definite quantity of a conductive liquid or mercury, a hollow movable member immersed in the mercury and provided with an orifice at its bottom through which the mercury flows, a pair of electrodes to contact the mercury and means to move the movable member to a position whereby the mercury flows out through the orifice under the effective head of the mercury in the movable member to open an electric circuit through said electrodes after a predetermined delay time.

According to this invention the configuration of the bore of the orifice and the means to maintain the mercury in continuous flow state are so selected respectively that the former assures continuous flow of the mercury at an effective head immediately before the lapse of said delay time, the latter assures contact between the orifice and the mercury outside the movable member at a proper time, while maintaining the mercury in the state of a unitary mass having a restricted neck portion as determined by the orifice.

In order that the invention may be more fully described, reference is made to the accompanying drawings in which like parts are designated by like reference numberals and characters, and in which.

Figures 5, 6:
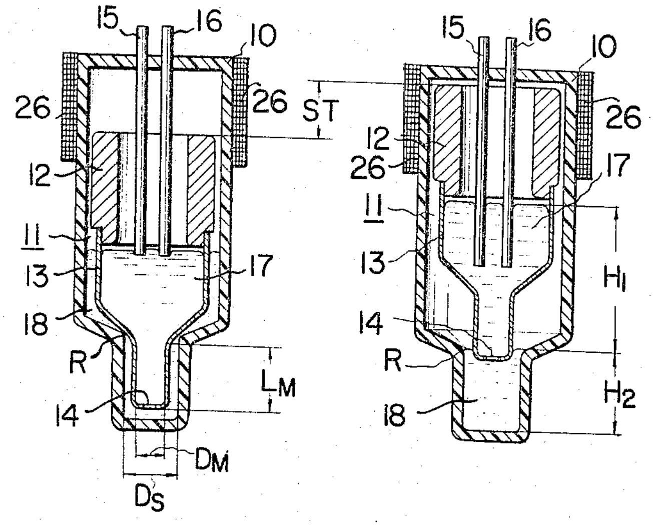
Figure 7:
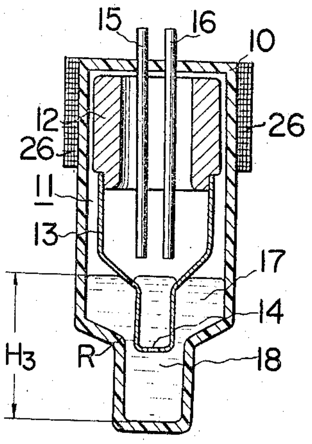
Figure 8:
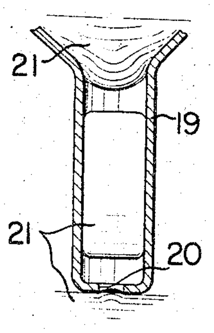
Figure 9:
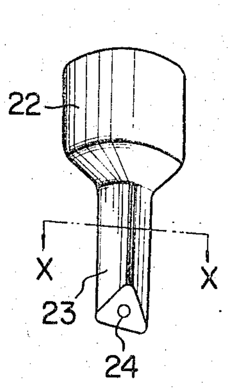
Figure 10:
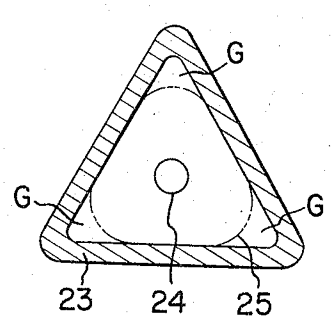

FIGS. 5–7 inclusive are elevational sectional views showing one embodiment of this invention in various operating states;

FIG. 8 is an elevational sectional view of the lower portion of the movable member to illustrate discontinuities of mercury;

FIG. 9 is a perspective view of a modified lower portion of movable member;

FIG. 10 is a sectional view taken along the line X—X in FIG. 9; and

Figure 11:
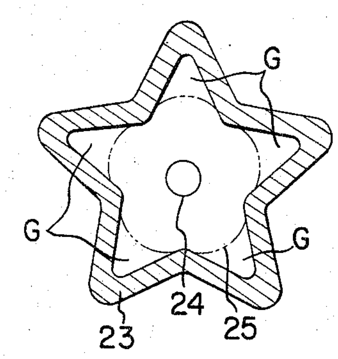

FIG. 11 shows a cross section of another form, said section corresponding to the view of FIG. 10.

Figure 1:
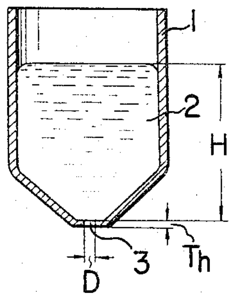
FIG. 1 is an elevational sectional view of a vessel adapted to explain the principle of this invention.
Figure 2:
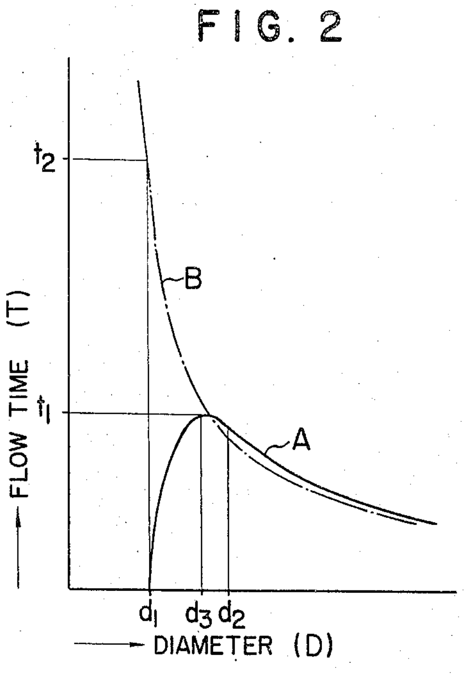
FIG. 2 is a graph to explain the relationship between the flow time and the diameter of the orifice.

Referring now to FIG. 1 of the accompanying drawing, a definite quantity of mercury 2 is contained in a top opened vessel 1 of a definite volume and provided with an orifice 3 at its bottom. For convenience, the orifice 3 is shown to be a circular opening having a diameter D. T*h* represents the thickness of the bottom wall of the vessel or the length of the flow path through the orifice, and H represents the effective head of the mercury 2. FIG. 1 shows a state wherein the orifice 3 is closed by a suitable means, not shown, so that when the orifice is opened, the mercury commences to flow outwardly of the vessel and the mercury level in the vessel 1 descends during said flowing-out of the mercury. In this case, since operation of the switch is induced by movement of the mercury level caused by flowing-out of the mercury, in the following explanation the period of time during which the flowing-out of the mercury continues will be denoted as the flow time T. Curve A in FIG. 2 shows the relationship between the flow time T and the diameter D where the thickness T*h* of the bottom wall or the length of the orifice is assumed to be constant for the sake of convenience. As can be observed from FIG. 2, where the diameter is smaller than a certain value $d_1$ the mercury cannot flow out of the vessel 1 since the effective head H is not sufficient to overcome the surface tension of the mercury so that the flow time is zero. On the other hand, where the diameter D of the orifice is larger than $d_2$, all of the mercury can flow out to empty the vessel 1. It is also clear that for values of the diameter D between $d_1$ and $d_2$, a portion of the mercury remains in the vessel since a point is reached where the effective head decreasing in accordance with the outflow of the mercury becomes insufficient to overcome the surface tension. It was found that the diameter $d_3$ which gives the maximum flow time $t_1$ can be expressed by $d_2 \geqq d_3 > d_1$.

As a result of experiments, it has also been found that when the thickness T*h* is varied to such an extent that the relation $$\frac{Th}{D} < 1$$

exists between the thickness T*h* and the diameter D, the flow time varies about 20% when the thickness T*h* is varied by 10 times, whereas in the range of $$1 < \frac{Th}{D} < 10$$

variation by 10 times of the thickness results in a variation by approximately two times in the flow time.

Figure 3:
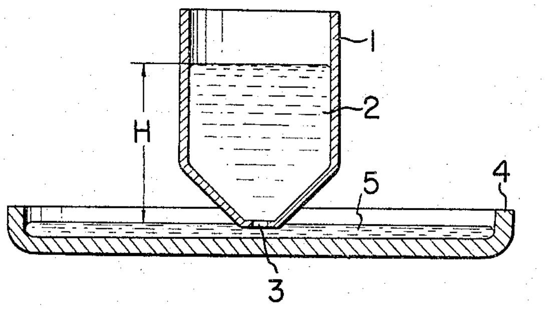
FIG. 3 is an elevational sectional view of a vessel and an associated dish-shaped container to explain the principle of this invention.

The relationship between the diameter D of the orifice and the flow time T of the device shown in FIG. 3 will now be considered. This device is different from that shown in FIG. 1 in that a dish-shaped container 4 containing a definite quantity of mercury 5 is disposed beneath the vessel 1, thus the mercury 2 communicates with the mercury 5 through the orifice 3. For the purpose of description it is assumed that the dish-shaped container 4 has a sufficient width so that the level of the mercury 5 does not change appreciably even when all of the mercury 2 in the vessel 1 flows out into the dish-shaped container 4. The flow time of the mercury in the vessel 1 is represented by curve B in FIG. 2. By comparing the curve B with the curve A it can be observed that, for diameters larger than $d_2$, the flow times represented by the curve B are somewhat shorter than those represented by curve A, and that where the diameter is smaller than $d_1$, the flow time becomes very long. This difference can be explained as follows by the flow condition of mercury:

In the case shown in FIG. 1 the mercury may remain in the vessel 1 when the diameter D of the orifice 3 is smaller than $d_2$, whereas in the case shown in FIG. 3 the mercury completely flows out even with diameters smaller than $d_1$, thus providing a characteristic curve B which is approximately inversely proportional to the square of the diameter of the orifice. Thus it was found that, in order to provide the characteristic curve B, the mercury body 2 in the vessel, and the mercury body 5 in the dish-shaped container 4 must maintain constant communication through a restricted neck portion as determined by the orifice to form a unitary mass during the flow without being interrupted in the orifice or near the ends thereof.

Figure 4:
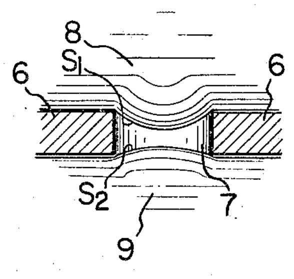
FIG. 4 is an enlarged sectional view of an orifice to explain a discontinuity of mercury.

The interrupted state of the mercury in or near the ends of the orifice is shown in FIG. 4, wherein a portion of the bottom wall of the vessel 1 is designated by reference numeral 6, and the bore of the orifice is designated by numeral 7. Line $S_1$ represents the lower surface of the mercury 8 subjected to the effective head, while line $S_2$, separated from the surface $S_1$, represented the upper surface of the mercury 9 which is in contact with the lower rim of the orifice. It will thus be apparent that if the thickness of the bottom wall 6 or the length of the orifice were less than that shown, surfaces $S_1$ and $S_2$ would contact each other, so that the mercury bodies 8 and 9 would be connected by the intermolecular attractive force into a unitary mass having a restricted neck. As will be described later, the configuration of the orifice bore comprises one of the important features of this invention.

A preferred embodiment of this invention will be described in conjunction with FIGS. 5, 6 and 7. A sealed container 10 made of a suitable electric insulator contains therein a movable member 11, mercury bodies 17 and 18 and a pair of electrodes 15 and 16 made of heat proof material. The movable member 11 comprises a cylinder 12 of thick wall and a vessel 13 of thin wall fixed to the lower end of the cylinder 12. The thin walled vessel 13 consists of three portions; a large diameter cylindrical portion, a gradually decreasing diameter portion and a tube-shaped slender portion having a bottom with an orifice 14 for restricting the flow of mercury. The weight of the movable member 11 is selected by considering the buoyancy afforded by the mercury and the volume of the vessel immersed in the mercury so that the gradually decreasing diameter portion of the thin walled vessel 13 normally engages a shoulder R of the sealed container 10 as shown in FIG. 5. In this normal position the lower ends of the electrodes 15 and 16 are immersed in the mercury 17 to close an electrical circuit (not shown) connected thereto.

The thick cylinder 12 of the movable member 11 is fabricated of a ferromagnetic material such as iron so that when a current is fed to the electromagnetic coil 26, the electromagnetic force causes a suction force between said magnetic coil 26 and said thick cylinder 12 and thereby lifts said movable member 11 by the specified distance ST instantly in the state such that the movable member 11 retains mercury 17 in the inside thereof. FIG. 6 shows the position of the movable member 11 at the moment when the current is fed to the electromagnetic coil 26, said movable member keeping mercury 17 in the inside thereof. As shown in FIG. 6 the depth of the mercury 18 outside the movable member 11 is represented by $H_2$, and the quantity of the mercury and the relative dimensions of the parts are such that the orifice 14 is still maintained below the surface of the mercury 18. The mercury 17 in the movable member 11 is caused to flow out under the effective head $H_1$ until a balanced state is reached, after a predetermined delay time, the depth of the mercury in this state being indicated by $H_3$ as shown in FIG. 7.

Immediately before this state is reached, one or both of the electrodes 15 and 16 become separated from the mercury, thus interrupting the electric circuit. In the state shown in FIG. 7, if the electromagnetic coil 26 is deenergized, the movable member 11 falls and causes, through a process opposite to the above-mentioned process, closure (corresponding to the state of FIG. 5) of the opened electrodes 15 and 16 after a predetermined delay time. Thus, a time delay switch is provided which closes or opens contact within a predetermined time after energization or deenergization of the electromagnetic coil 26.

In this embodiment, the orifice 14 is always maintained in constant communication with both the inner and outer bodies of mercury 17 and 18, and therefore the mercury is caused to flow while always being maintained as a unitary mass having a restricted neck portion. Actually, it is important that the length of the orifice be far less than its diameter to improve the accuracy of the switch because the mercury may become interrupted as shown in FIG. 4 owing to small vibrations created by the switch itself or shocks or vibrations imparted thereto from the outside when the difference between the levels of the free surfaces of mercury bodies 17 and 18 is decreased. In other words, it is advantageous to select the length of the orifice to be of a value such as to cause surfaces $S_1$ and $S_2$ of the mercury bodies, shown in FIG. 4, to contact each other again even if they are temporarily separated in the orifice under an effective head at the moment of separation of the electrode 15 or 16 from the surface of the mercury at an intermediate state prior to attainment of the equilibrium state shown in FIG. 7 during the period in which the mercury 17 flows out. As mentioned above, the configuration of the bore of the orifice is one of important features of this invention.

The reason for providing the tube-shaped slender portion of a small diameter $D_M$ at the lower end of the thin walled vessel 13 is one of suitable means to decrease the quantity of the outside mercury 18 in order to maintain contact between the orifice 14 and the outside mercury when the movable member 11 is raised by a distance ST from the normal position shown in FIG. 5 to the raised position shown in FIG. 6.

Now, another example will be described in the following. According to this example, the tube-shaped slender portion having diameter $D_M$ of the thin walled vessel 13 can be more reduced by means of a more effective system such as described later. When the portion having the diameter $D_M$ is made to be slenderer, the lower part of the sealed container 10 having diameter $D_S$ can be made to be slenderer, whereby mercury is more effectively economized and more improvement of vibration-resistivity can be made possible. When the diameter $D_M$ of the slender portion is reduced below a certain limit, such discontinuous state of the mercury as shown in FIG. 8 will occur when any vibration is applied thereto, whereby restoration of said state to continuous state becomes difficult, thus hindering flow of the mercury as described before. Referring to FIG. 8, reference numerals 19, 20 and 21 designate, respectively, the slender portion which is slenderer than the above-mentioned limit, a small orifice at the bottom of said slender portion, and the mercury. However, when the tube-shaped slender portion of the thin walled vessel is formed as shown in FIGS. 9 and 10, it becomes possible to avoid the above-mentioned discontinuous state.

FIG. 9 shows a perspective view of a modified thin walled vessel, a portion of the movable member comprising a main body 22, and a slender lower portion 23 of triangular cross section as shown in FIG. 10, said slender portion being provided with an orifice 24 at its bottom. When a slender portion having triangular cross section is used, the cross section of mercury contained therein assumes a shape as indicated by the dot-and-dash line 25 in FIG. 10 whereby corner spaces G are not filled with mercury. It was found that this construction can prevent the discontinuous state of mercury shown in FIG. 8. In addition to the triangular cross section, other polygonal sections such as a star-shaped cross section may be used as shown in FIG. 11.

Further embodiment relates to an effective system adapted to reduce the quantity of the mercury outside the movable member by shortening the length of the tube-shaped slender portion of the movable member 11, thereby reducing the quantity of the mercury which is not directly utilized for providing the predetermined delay time of the switch. Referring again to FIGS. 5 through 7, assuming that the tube-shaped slender portion of the movable member 11 is shorter than that of these figures, in this case, the orifice and mercury surface outside the movable member are temporarily detached from each other when the movable member having a shortened slender portion is brought from the state of FIG. 5 to the state of FIG. 6 which shows the instant when the movable member is raised by energization of the electromagnetic coil 26, since the effective head $H_1$ of the mercury 17 in the movable member is high enough at said instant, flowing-out of the mercury continues for some time. And this flowing-out of the mercury 17 brings the ascending of the surface of the outside mercury 18. When the length $L_M$ of the lower tube-shaped slender portion of the thin walled vessel 13 is selected in such a manner that the orifice 14 is caused to contact the outside mercury 18 at the time just prior to the critical moment when the flow-out of the mercury 17 stops unless continuity of the mercury must rely upon the contact between the orifice 14 and the outside mercury 18, it becomes possible to decrease said length $L_M$, whereby the length of the bottom portion having the diameter $D_S$ of the vessel 10 can be decreased accordingly, thereby decreasing the quantity of the outside mercury 18 which is not directly effective for the flow time. If this embodiment is illustrated by figure, the vessel of the movable member in this embodiment will assume the construction obtained by modifying the vessel 13 of FIG. 5 to be the vessel 1 of FIGS. 1 and 3 in which the tube-shaped slender portion is shortened.

The switch having the construction shown in FIGS. 5 through 7 is of a normally closed time delay opening type since, when the movable member 11 thereof is in the normal position shown in FIG. 5 as determined by its own weight, the electrodes 15 and 16 are in contact with the inside mercury 17 but become disengaged from the mercury a predetermined time after the movable member is raised. However, by modifying the switch so that at least one of the electrodes 15 and 16 is held out of contact with the mercury in the state shown in FIG. 5 and that both electrodes are immersed in the mercury in the state shown in FIG. 6, then a time delay switch can be obtained wherein the contacts are closed only during a period from the instant of raising the movable member to an instant which is later by a predetermined delay time, whereas they are held opened during the other periods.

Where the time delay switch is employed in D-C circuits, the make and break capacity thereof can be increased by decreasing the length of the electrode 15 relative to that of the electrode 16 so that a spark is always established on the electrode 15 and by connecting the electrodes 15 and 16 to the negative and positive poles, respectively, of the electric circuit so that the spark always appears on the negative electrode, thereby minimizing evaporation of mercury by that difference in the potential gradients and wear of the electrode rod and preventing contamination of the mercury. This arrangement is especially useful for improving the make and break capacity of a time delay switch wherein the mercury flows very slowly as shown in the embodiment of this invention. Alternatively, an additional electrode not shown may be provided at the lower portion of the sealed container to be always immersed in mercury so that current flows always from this additional electrode to the electrodes that engage and disengage the mercury.

While the invention has been described with reference to some preferred embodiments thereof, it should be understood that the invention is not limited thereto but many modifications may be made therein without departing from the true spirit and scope of the invention.

What we claim is:

1. A time delay switch comprising a sealed container having a quantity of a conductive liquid therein which forms a convex meniscus, a hollow member disposed within said sealed container for vertical movement therein, said hollow member also having a quantity of said conductive liquid therein, said hollow member having a bottom wall provided with an orifice, the wall being of a thickness substantially less than the diameter of said orifice, so that the combined thicknesses of the convex meniscuses formed on opposite sides of said orifice by said conductive liquid is greater than the thickness of the wall to thereby maintain a state of constant contact between the conductive liquids internally and externally of the hollow member, means for moving said hollow member within the sealed container substantially instantaneously between lowered and raised positions whereby when the hollow member is raised, the conductive liquid contained therein flows gradually under the force of its own weight through the orifice and into the sealed container, said lowered and raised positions corresponding respectively to closed and open positions of an electrical circuit, a pair of electrodes positioned within said hollow member and immersed in the conductive liquid therein when said hollow member is in its lowered position and exposed when said hollow member is in its raised position and the conductive liquid flows therefrom.

2. A time delay switch as claimed in claim 1 in said hollow member includes a slender lower portion having said bottom wall provided with an orifice and wherein said slender lower portion has a polygonal cross-section only partially filled by said conductive liquid to thereby prevent a discontinuity in the constant contact between the conductive liquids.

References Cited

UNITED STATES PATENTS

| | | | |
|---|---|---|---|
| 2,295,602 | 9/1942 | Pollard | 335—52 |
| 2,929,889 | 3/1960 | Efther | 200—33 |
| 3,141,940 | 7/1964 | Horowitz | 335—52 |
| 3,142,736 | 7/1964 | Mitchell | 335—52 |

BERNARD A. GILHEANY, *Primary Examiner.*

F. E. BELL, *Assistant Examiner.*